E. YODER.
RESILIENT HUB FOR VEHICLE WHEELS.
APPLICATION FILED MAY 28, 1912.

1,044,619.

Patented Nov. 19, 1912.
2 SHEETS—SHEET 1.

Witnesses
G. H. Baker.
E. J. Clements.

Inventor
Edward Yoder
By J. Howlett Davis
Attorney

E. YODER.
RESILIENT HUB FOR VEHICLE WHEELS.
APPLICATION FILED MAY 28, 1912.
1,044,619.
Patented Nov. 19, 1912.
2 SHEETS—SHEET 2.
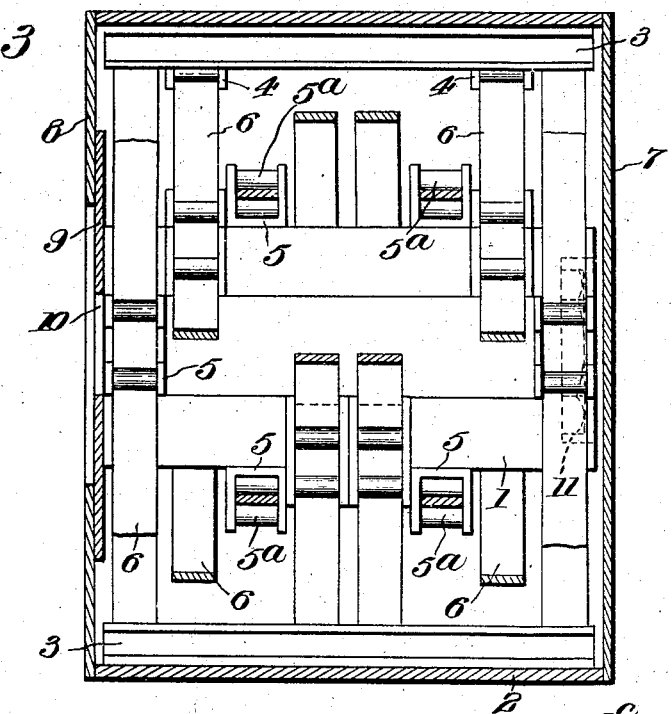
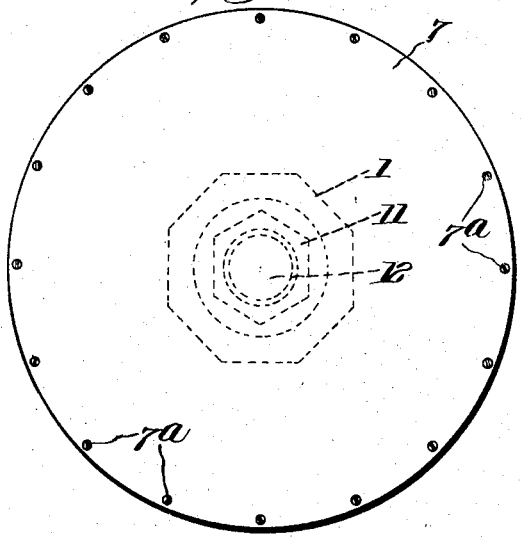
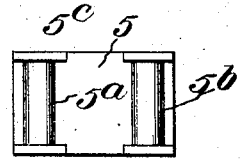
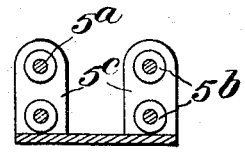
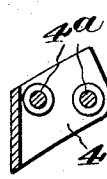
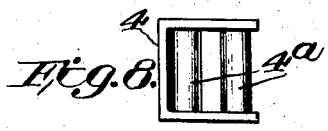
Witnesses
G. F. Baker
E. J. Clements
Inventor
Edward Yoder
By
J. Howlett Davis
Attorney

UNITED STATES PATENT OFFICE.

EDWARD YODER, OF TULSA, OKLAHOMA.

RESILIENT HUB FOR VEHICLE-WHEELS.

1,044,619.  Specification of Letters Patent.  Patented Nov. 19, 1912.

Application filed May 28, 1912. Serial No. 700,207.

*To all whom it may concern:*

Be it known that I, EDWARD YODER, a citizen of the United States, residing at Tulsa, in the county of Tulsa and State of Oklahoma, have invented certain new and useful Improvements in Resilient Hubs for Vehicle-Wheels, of which the following is a specification.

My invention relates to resilient wheels for vehicles, and particularly to wheels of that type wherein the resiliency is obtained in the hub construction, rather than in the rim or spokes.

The object of the invention is to provide a wheel of this character made up of but few and interchangeable parts, and possessing the necessary strength and simplicity to render it available for commercial purposes.

Figure 1:
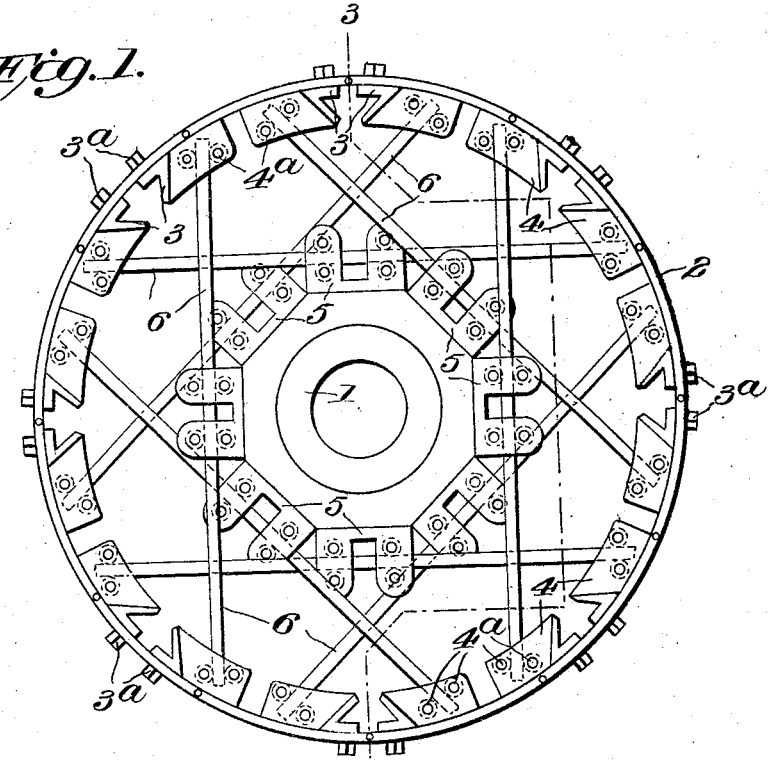
Figure 2:
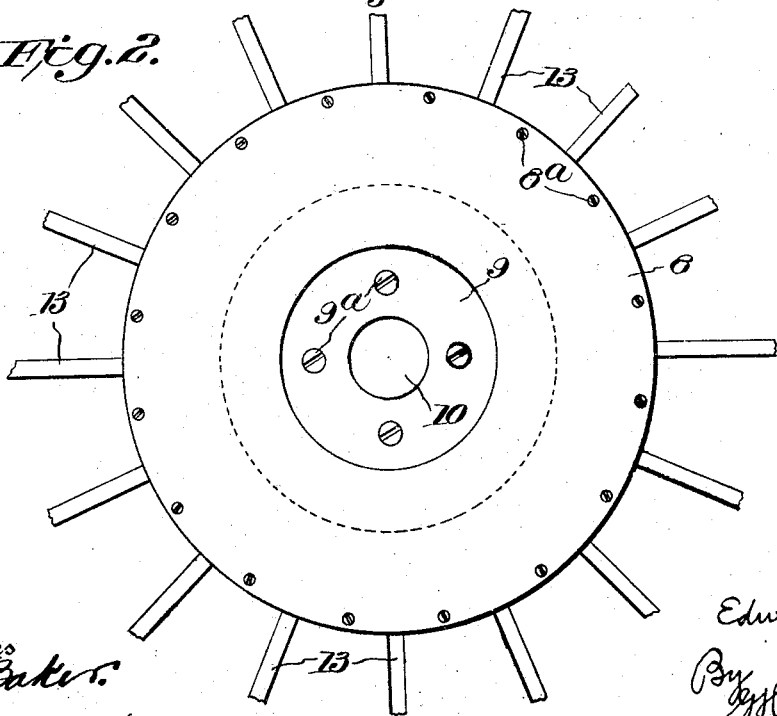

To this end, the invention comprises the construction and combination of parts hereinafter described and claimed, and shown in the accompanying drawings, in which, Figure 1 is a side elevation of my improved hub, with one of the end plates removed; Fig. 2 is a side elevation of the complete hub looking from inside the vehicle; Fig. 3 is a transverse section substantially on the line 3—3 of Fig. 1; Fig. 4 is an outside elevation of the complete hub, the spokes being omitted; Fig. 5 is a plan view of one of the brackets employed; Fig. 6 is a sectional elevation thereof; Fig. 7 is a sectional elevation of another form of bracket, and, Fig. 8 is an end elevation thereof.

Referring to the drawings in detail, my improved hub comprises an inner member 1 and an outer member 2, concentrically disposed and spaced apart. The inner member 1 is preferably polygonal or prismatic in shape, while the other member is preferably cylindrical. Secured to the inside of the member 2 are a plurality of ribs 3 arranged in pairs, and extending axially along such member. These ribs are preferably in the form of angle irons of special shape, as shown in Fig. 1, and may be secured to the member 2 by means of bolts $3^a$. Secured to each of the ribs 3 are brackets 4, of the form shown in Figs. 7 and 8. By reference to these figures it will be seen that each bracket comprises a base, and a pair of side plates between which are journaled a pair of rollers $4^a$. Secured to the faces of the prismatic member 1 are brackets 5, of a form shown in Figs. 5 and 6. By reference to these figures it will be seen that each of these brackets comprises a base having two pairs of upstanding side plates $5^c$, between which are journaled two pairs of rollers $5^a$ and $5^b$.

The members of each pair of rollers $4^a$, $5^a$ and $5^b$ are spaced apart the same distance, such distance being slightly greater than the thickness of each of a series of flat leaf springs 6, which constitute the means connecting the two hub members. As shown in the drawings, the member 1 is octagonal, and has eight faces to which the brackets 5 are secured. Upon each face two such brackets are mounted, the members of each pair of brackets being spaced apart as shown in Fig. 3. There are thus sixteen brackets, and between the rollers of each bracket is freely mounted one of the springs 6. The ends of each of such springs is engaged by the rollers of a pair of brackets 4 secured to the outer member 2. There are thus thirty-two brackets, such as 4, employed, two of such brackets being secured to each rib 3. It will thus be seen that each of the straight flat springs 6 is supported at its middle by one of the brackets 5, secured to the inner hub member, and is supported at its ends by two of the brackets 4, secured to the outer member. It will also be noted that each of these springs, geometrically considered, forms a chord of the circle formed by the outer hub member. It will be observed furthermore that the springs 6 are free to move endwise on the rollers of the brackets and thus an unrestricted flexure of the springs is permitted and a high degree of resiliency obtained. It will be seen that the load is carried simultaneously by practically all of the springs, different springs being under different degrees of tension according to their position. The inner hub is both suspended and supported from below by the springs.

By reference to Fig. 3, it will be seen that the springs, while arranged in pairs, are spaced apart, the members of each pair being alternated with the members of another pair so as to obtain a symmetrical arrangement and a uniform distribution of the load along the length of the hub. The outer end of the hub is closed by the plate 7 secured to the member 2 by means of screws $7^a$, and the inner end is closed by a corresponding plate 8, of annular form, attached by means of screws 8ª. Arranged just inside of the plate 8 and capable of sliding movement thereagainst, is a circular plate 9, secured to the hub member 1 by means of screws 9ª, (see Fig. 2) and provided with a central opening 10 adapted to receive the spindle 12 (see Fig. 4). The hub may be held in place on the spindle by means of a suitable nut 11, and suitable spokes 13 may be secured to the hub in any desired manner.

It will thus be seen that my improved resilient hub is very strong and simple in construction and comprises but few parts, such parts being duplicates of one another and interchangeable, and it is thought that the advantages of my improved construction will be readily appreciated without further discussion.

What I claim is:—

1. In a resilient wheel, inner and outer hub members, concentrically disposed, brackets rigidly secured to the outside of said inner member and the inside of said outer member, and leaf springs having their middle portions in engagement with the brackets carried by the inner member, and their end portions in engagement with the brackets carried by said outer member, said springs being capable of free endwise movement through all of said brackets.

2. In a resilient wheel, inner and outer hub members, concentrically disposed, brackets secured to the outside of said inner member and the inside of said outer member, pairs of rollers spaced apart and journaled in said brackets, and leaf springs freely held between said rollers, each spring being supported by two brackets on one member and a single bracket on the other.

3. In a resilient wheel, the combination with an inner polygonal hub member, and an outer hub member, of a plurality of flat leaf springs associated therewith, means carried by said outer member for slidably supporting each spring at its ends, and means for holding each spring parallel with and at a fixed distance from a face of said polygonal member, such holding means permitting free endwise movement of the spring in a direction parallel with such face.

In testimony whereof I affix my signature in presence of two witnesses.

EDWARD YODER.

Witnesses:
JOHN BARRETT,
E. E. BARRETT.

---

Copies of this patent may be obtained for five cents each, by addressing the "Commissioner of Patents, Washington, D. C."